United States Patent
Rodriguez

(10) Patent No.: US 8,234,513 B2
(45) Date of Patent: Jul. 31, 2012

(54) POWER MANAGEMENT METHOD

(75) Inventor: Jean-Michel Rodriguez, Montpelier (FR)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 12/233,707

(22) Filed: Sep. 19, 2008

(65) Prior Publication Data
US 2010/0070790 A1   Mar. 18, 2010

(51) Int. Cl.
G06F 1/00   (2006.01)
G06F 1/26   (2006.01)
G06F 1/32   (2006.01)

(52) U.S. Cl. .................. 713/340; 713/320; 713/324
(58) Field of Classification Search .................. 713/320, 713/324, 340
See application file for complete search history.

(56) References Cited

U.S. PATENT DOCUMENTS

| | | | |
|---|---|---|---|
| 5,502,689 A * | 3/1996 | Peterson et al. | 368/156 |
| 5,752,050 A * | 5/1998 | Hernandez et al. | 713/330 |
| 5,918,059 A * | 6/1999 | Tavallaei et al. | 713/300 |
| 7,203,756 B2 * | 4/2007 | Tapperson | 709/227 |
| 7,318,164 B2 * | 1/2008 | Rawson, III | 713/320 |
| 2005/0055547 A1 * | 3/2005 | Kawamura | 713/155 |

* cited by examiner

*Primary Examiner* — Mark Rinehart
*Assistant Examiner* — Jeremy S Cerullo
(74) *Attorney, Agent, or Firm* — Cantor Colburn LLP

(57) ABSTRACT

A method of managing IT resources when an IT resource managed by a coordinator is subject to a power-off request is provided. The method includes, in an event a sufficient quantity of resource statistics is present, analyzing resource statistics and operational policies to determine whether execution of the power-off request is currently, futuristically or potentially futuristically achievable with a threshold efficiency, and, in an event the power-off request is currently, futuristically or potentially futuristically achievable with the threshold efficiency, executing the power-off request, identifying a first time when the power-off request is achievable, instituting a first delay until then and, subsequently, executing the power-off request, and identifying a second time when the power-off request is potentially achievable, instituting a second delay until then and, subsequently, returning control to the analyzing operation, respectively.

6 Claims, 2 Drawing Sheets

POWER MANAGEMENT METHOD

CLAIM OF PRIORITY

Figure 1:
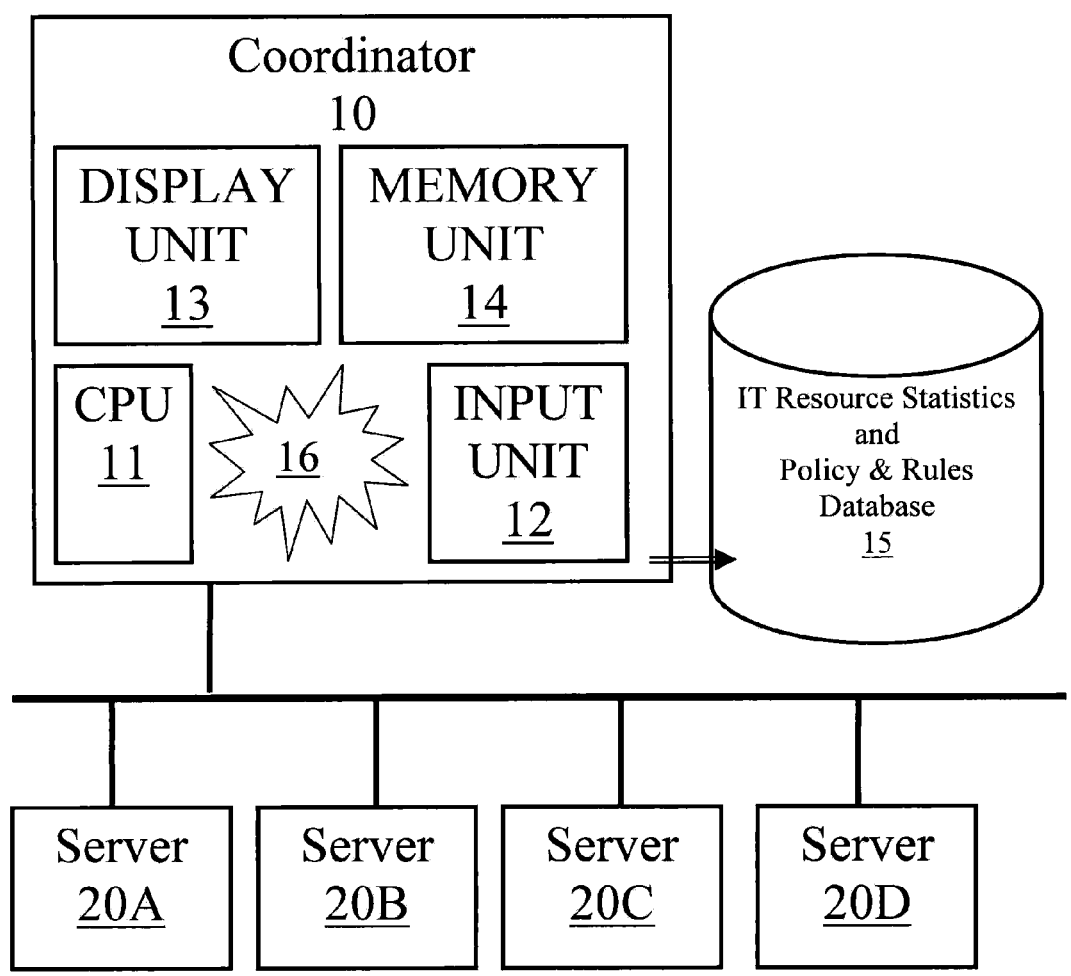

This application claims priority to European Patent Application No. EP08305559.0, filed Sep. 17, 2008 and incorporated by reference herein in its entirety.

BACKGROUND

Aspects of the present invention are directed to a power management method and, more particularly, to a method of managing power of information technology (IT) resources when an IT resource is subject to a power-off request.

The power management of IT resources, such as a cluster of servers, in a framework infrastructure has become an important issue in infrastructure design since an amount of power consumed by servers may be significant where large clusters of servers are connected together in single rooms. In these cases, if the power consumption of the servers is not controlled, the amount of energy consumed and the corresponding amount of heat to be dissipated in such rooms may negatively impact the performance and functionality of the servers in addition to driving up the overall cost of operation of the servers and the rooms.

As proposed solutions for these problems, controllers have been employed to measure the power consumption of a server. Such measurements indicate whether a server is running an application before executing of a power-down operation for that server is initiated. These proposed solutions have problems, however, in that the controllers are not tailored for use framework infrastructure and since the power-off operations themselves tend to generate undesirable power consumption levels.

SUMMARY

In accordance with an aspect of the invention, a method of managing IT resources when an IT resource managed by a coordinator, which is configured to access a database in which resource statistics and operational policies are stored, is subject to a power-off request is provided and includes, in an event a sufficient quantity of the resource statistics is stored within the database, analyzing the resource statistics and the operational policies to determine whether execution of the power-off request is currently, futuristically or potentially futuristically achievable with a threshold efficiency, in an event the power-off request is currently achievable with the threshold efficiency, executing the power-off request, in an event the power-off request is futuristically achievable with the threshold efficiency, identifying a first time when the power-off request is achievable, instituting a first delay until then and, subsequently, executing the power-off request, and, in an event the power-off request is potentially futuristically achievable with the threshold efficiency, identifying a second time when the power-off request is potentially achievable, instituting a second delay until then and, subsequently, returning control to the analyzing operation.

BRIEF DESCRIPTIONS OF THE SEVERAL VIEWS OF THE DRAWINGS

Figure 2:
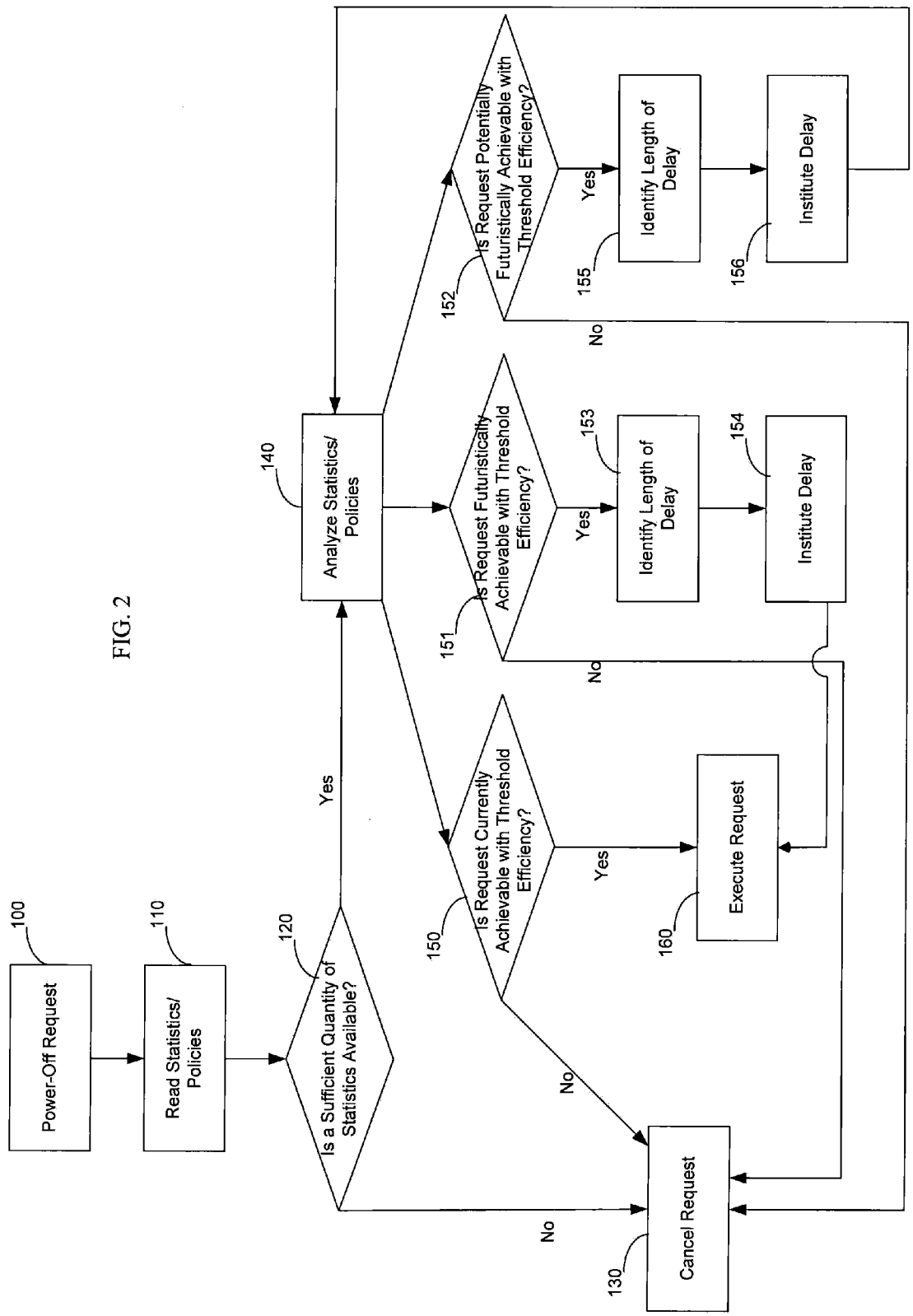

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a schematic diagram of an exemplary coordinator and an exemplary cluster of servers in accordance with embodiments of the present invention; and FIG. 2 is a flow diagram illustrating a method of managing IT resources when an IT resource managed by the coordinator of FIG. 1 is subject to a power-off request in accordance with embodiments of the present invention.

DETAILED DESCRIPTION

With reference to FIG. 1 and in accordance with an aspect of the invention, a computing environment is provided and includes an information technology (IT) resource coordinator 10 (hereinafter referred to as "coordinator 10"), a database 15, which is accessed by the coordinator 10 and on which IT resource statistics and operational policies and rules are stored, and IT resources (hereinafter referred to as "Servers") 20A-D, which are managed by the coordinator 10.

The coordinator 10 and the servers 20A-D may each include a computing device. In that capacity, the coordinator 10 includes a central processing unit (CPU) 11, an input unit 12 by which an operator of the computing environment can input commands to the coordinator 10, a display unit 13, to which a display device, such as a monitor, is attached, by which the coordinator 10 displays information to the operator and a memory unit 14. The memory unit 14 may include random access memory (RAM), read-only memory (ROM) or other forms of storage on which, at least, instructions to enable the CPU to manage the servers 20A-D are stored. A bus 16, provided within the coordinator 10, allows the CPU 11, the input unit 12, the display unit 13 and the memory unit 14 to interact with one another.

The database 15 may be stored within the coordinator 10, generally, the memory unit 14 of the coordinator 10 or, alternately, may be located remotely from the coordinator 10. In either case, the database 15 includes at least IT resource pool behavior statistics, resource utilization statistics, and policy and rules information. The IT resource pool behavior statistics relate to the pool of servers 20A-D to the extent that the servers 20A-D each have similar architectures, behavior patterns and processes. As such, the IT resource pool behavior statistics include data that is representative of a number of resources in the pool, availabilities of those resources based on date and time information and past use patterns, an overall workload of the resources, individual resource workloads, and behaviors of the pool within a given period of time. The resource utilization statistics relate more specifically to the individual servers 20A-D. That is, the utilization statistics describe behaviors of each of the servers 20A-D at various times and under various workload demands. For example, the utilization statistics will indicate that a given operation, such as an execution of a power-off request, operates at certain efficiency at given times and under given preconditions.

Thus, with respect to the computing environment of FIG. 1, if server 20B is powered down, server 20A has a relatively low workload and servers 20C and 20D have relatively high workloads, the IT resource pool behavior statistics and the utilization statistics will together show that servers 20A, 20C and 20D are currently operational, that server 20A has a relatively low workload and that servers 20C and 20D have relatively high workloads. In addition, if, for example, the computing environment is an office building and a current time is 11:59 AM, the IT resource pool behavior statistics and the utilization statistics may further indicate that a drop in the overall workload of the resources is expected to occur shortly, in accordance with the lunch hour, and to last until 1:00 PM.

The policy and rules information of the database 15 may include general rules that are established to govern the operation of the computing environment. For example, one such rule may be that, at the very least, server 20A must operate and/or continue to operate during the lunch hour. Conversely, another rule may be that none of the servers 20B-D can operate under any circumstances between 2 and 3:00 AM so as to allow for service and or update installations.

With reference to FIG. 2, with the configuration described above, when one of the servers 20A-D is subject to a power-off request (100) or, rather, any request for a computing operation, the coordinator 10, in its capacity as a manager for that one server (e.g., server 20A), accesses and reads from the database 15 the IT resource pool statistics, the utilization statistics (hereinafter referred to as "resource statistics") and the policies and rules (110) and determines whether a sufficient quantity of the resource statistics are present (120). The sufficient quantity may be predetermined in accordance with a default quantity, an operator inputted quantity or information gleaned from analysis of previous requests. If the sufficient quantity of the resource statistics is determined to not be present or in some other sense unavailable, the request is cancelled (130). In an event the sufficient quantity of the resource statistics is present and available, the coordinator 10 proceeds to analyze the resource statistics along with the operational policies (140) to determine whether execution of the power-off request is currently (150), futuristically (151) or potentially futuristically achievable (152) with a threshold efficiency.

In particular, the coordinator 10 may analyze the resource statistics to determine a current workload of the servers 20A-D and, from that determination, further determine whether the computing system can absorb the power-off of server 20A in accordance with the request. The coordinator 10 may further analyze the operational policies to determine whether a shut down is permitted or not.

Still further, the coordinator 10 may analyze whether an execution of the power-off request can be executed efficiently. In this case, the coordinator 10 may determine whether server 20A is currently working at a high workload that will need to be cancelled and/or transferred to another server. Such a cancellation and/or transfer could indicate that any power savings from a shut down will be negated by the additional power required for the cancellation and/or transfer.

More significantly, the coordinator 10 may determine from the resource statistics that, while server 20A could be currently shut down, its processing resources will be required shortly (e.g., at a particular time of day when computing resources are generally used by large groups of people) and that, as such, it will be necessary to reboot server 20A relatively shortly after the execution of the power-off request. Such closely timed powering down and powering up is inherently inefficient given the high power requirements for those operations and, therefore, the coordinator 10 may determine that execution of the power-off request cannot be accomplished efficiently.

Of course, it is understood that, in addition to the determinations discussed above, the coordinator 10 may perform still further determinations based on the resources statistics and the operational policies. These include, but are not limited to, determining that a power-off request of server 20A precedes a required power-off or on operation of server 20A and that, as such, the current power-off request cannot be executed efficiently and determining that a current workload of the servers 20A-D is relatively high but is expected to drop and that, as such, while the request cannot be currently executed efficiently, it is possible that it could be executed sometime in the future.

Here, the determination of whether the power-off request can be executed efficiently includes a comparison between an expected efficiency level of an execution of the request and a stored threshold efficiency level. Such a stored efficiency level can be a default efficiency level, an efficiency level inputted by an operator or an efficiency level that is currently established in accordance with current computing conditions.

Based on a result of the determination by the coordinator 10, in an event the power-off request is determined to be currently achievable with the threshold efficiency (150), the coordinator 10 either executes the power-off request of the server 20A or send a signal to the server 20A to execute the power-off request (160). Conversely, in an event the power-off request is determined to be futuristically achievable with the threshold efficiency (e.g., the operational policies indicate that server 20A is not allowed to be currently powered off for a pre-selected period of time) (151), the coordinator 10 identifies a first time when the power-off request is achievable (153), institutes a first delay until the first time (154) and, subsequently, either executes the power-off request of the server 20A or send a signal to the server 20A to execute the power-off request (160). Still further, in an event the power-off request is determined to be potentially futuristically achievable with the threshold efficiency (e.g., the current workload of the servers 20A-D is relatively high but is expected to decrease) (152), the coordinator 10 identifies a second time when the power-off request is potentially achievable (155), institutes a second delay until then (156) and, subsequently, returns control of the method to the analyzing operation (140).

In an event the sufficient quantity of the resource statistics is not present or, in an event that the power-off request is determined to not be currently, futuristically or potentially futuristically achievable, the coordinator 10 either cancels the power-off request or sends a signal to the server 20A to cancel the power-off request.

Still referring to FIG. 2, in accordance with another aspect of the invention, a machine readable medium having instructions stored thereon to cause a resource coordinator to execute a method of managing IT resources when an IT resource managed by the coordinator is subject to a power-off request is provided. The method includes, in an event a sufficient quantity of resource statistics is present, analyzing the resource statistics and operational policies to determine whether execution of the power-off request is currently, futuristically or potentially futuristically achievable with a threshold efficiency, in an event the power-off request is currently achievable with the threshold efficiency, executing the power-off request, in an event the power-off request is futuristically achievable with the threshold efficiency, identifying a first time when the power-off request is achievable, instituting a first delay until then and, subsequently, executing the power-off request, and, in an event the power-off request is potentially futuristically achievable with the threshold efficiency, identifying a second time when the power-off request is potentially achievable, instituting a second delay until then and, subsequently, returning control to the analyzing operation. The method may further include a cancellation of the power-off request in an event the sufficient quantity of the resource statistics is not present or in an event that the power-off request is determined to not be currently, futuristically or potentially futuristically achievable.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method of managing IT resources when an IT resource managed by a coordinator, which is configured to access a database in which resource statistics and operational policies are stored, is subject to a power-off request, the method comprising:

in an event a sufficient quantity of the resource statistics is stored within the database, analyzing the resource statistics and the operational policies to determine whether execution of the power-off request is currently, futuristically or potentially futuristically achievable;

in an event the power-off request is currently achievable, executing the power-off request;

in an event the power-off request is futuristically achievable, identifying a first time when the power-off request is achievable, instituting a first delay until then and, subsequently, executing the power-off request; and in an event the power-off request is potentially futuristically achievable, identifying a second time when the power-off request is potentially achievable, instituting a second delay until then and, subsequently, returning control to the analyzing operation.

2. The method according to claim 1, further comprising cancelling the power-off request in an event the sufficient quantity of the resource statistics is not present or the power-off request is not currently, futuristically or potentially futuristically achievable.

3. The method according to claim 1, wherein the analyzing of the resource statistics and the operational policies comprises accessing the database and reading the resource statistics and the operational policies therefrom.

4. The method according to claim 1, wherein the sufficient quantity of the resource statistics is predetermined in accordance with a default quantity.

5. The method according to claim 1, wherein the sufficient quantity of the resource statistics is predetermined in accordance with an operator inputted quantity.

6. The method according to claim 1, wherein the sufficient quantity of the resource statistics is predetermined in accordance with information relating to previous requests.

* * * * *